Feb. 27, 1968 R. R. LACHENMAYER 3,371,320

MULTIPURPOSE MATRIX

Filed March 12, 1965 5 Sheets-Sheet 1

INVENTOR
RICHARD R. LACHENMAYER
BY
Griffin and Stokes

A TRANSLATOR

United States Patent Office 3,371,320

Patented Feb. 27, 1968

3,371,320
MULTIPURPOSE MATRIX
Richard R. Lachenmayer, St. Paul, Minn., assignor to Sperry Rand Corporation, New York, N.Y., a corporation of Delaware
Filed Mar. 12, 1965, Ser. No. 439,378
14 Claims. (Cl. 340—172.5)

ABSTRACT OF THE DISCLOSURE

The disclosed device comprises an N-bit data input register, an N-bit data output register, a transformer-diode matrix, first and second translators, and an $N+1$ bit control register. One bit of a control word entered into the control register determines whether the remaining bits of the control word are applied to the first or second translator. The translators control the matrix to determine the function performed on a data word entered into the input register. The device performs the functions of circular shift, pattern location, coincidence detection, and permutation.

In the field of those data processing functions particularly concerned with pattern analysis and recognition there is considerable need for logical circuitry to perform certain specified functions such as are stated above. In a circular shift function a multibit data word, whose information bits occupy specified input positions, is shifted end around such that said information bits occupy different output positions. In the pattern location function, specified arrangements of bits in a data word are searched for. A coincidence detection function involves the comparison of a control word with all shifted forms of a data word in order to find that shifted form, if any, having information bits in the same positions as are found in the control word. By permutation function is meant the interchange of two bits of a data word in any two positions.

The present invention provides a single matrix system capable of selectively performing the aforementioned functions without discrimination. Utilization of a single and more economical matrix system means less hardware to perform the functions, with there further being no need to alter the operation or characteristics of the multiple decision elements employed in the matrix system.

Therefore, one object of the present invention is to provide a multipurpose matrix system for performing a variety of logical functions using the same configuration of decision elements therein.

Another object of the present invention is to provide a multipurpose matrix system whose particular mode of operation is primarily determined by the content of a control word introduced to the system at the same time as a data word to be operated upon.

These and other objects of the present invention will be apparent during the course of the following description to be read in view of the drawings, in which.

Figure 1:
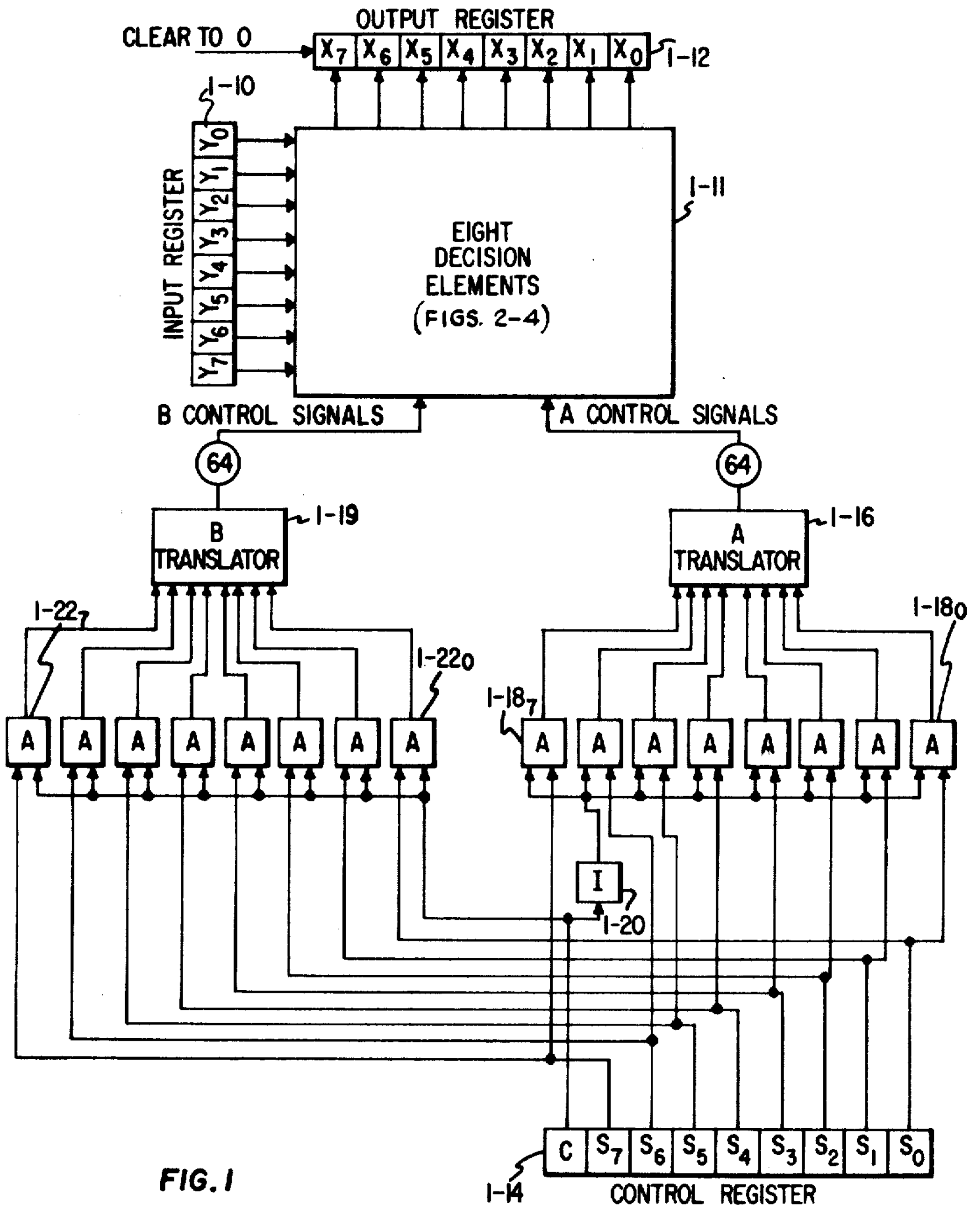
FIG. 1 is a block diagram of the overall matrix system.

Reference will first be made to FIG. 1 which shows the main portions of the system in block form. For the purposes of description only, the illustrated embodiment of the invention is shown constructed to operate upon an 8-bit data word by means of an 8-bit control word, although the system may obviously be built with any fewer or greater number of bits according to the dictates of the particular environment in which it is employed. The data word to be operated upon or analyzed is initially placed into an eight stage Input data word register 1–10 whose individual stages are numbered $Y_0$ through $Y_7$, each stage being capable of holding either a 1 or a 0 bit value in well known fashion. The input data word hereinafter is identified as the Y word, with its individual bit positions or orders being designated by the appropriate subscript $Y_0$, $Y_1$, $Y_2$, etc. The outputs from register 1–10 are applied to an arrangement 1–11 of plural decision elements the exact number of which is identical to the number of data word bits, i.e. eight in the disclosed embodiment. The composition of each decision element and its interconnection within the system will be more specifically described in subsequent paragraphs.

An Output data word register 1–12 is provided for receiving from decision element arrangement 1–11 either the altered input word Y, or alternatively, for receiving the results of an analysis on the Y word. Output register 1–12 has a number of bit stages equal to the number of stages in register 1–10, with each output position being labelled $X_0$, $X_1$, etc. to $X_7$. Thus, the output from the system can be hereafter identified as the X word.

The particular logical function to be performed by the matrix system in FIG. 1 is chosen by the contents of a Control register 1–14. The Control register 1–14 contains eight stages labelled $S_0$ through $S_7$, as well as a single stage C for holding an additional ninth bit. For any of the four above described functions of which the system is capable an eight bit control word, herein identified as an S word, is placed into stages $S_0$ through $S_7$ in order to specify and control the operation performed upon the input data word Y. The number of bits in the S control word is equal to the number of bits in the input data word Y. The state of the additional ninth stage C of control register 1–14 is used to determine which one of two broad classes of functions is to be performed, the first class consisting of the functions of circular shift, pattern location, and coincidence detection, while the second class consists of the permutation function. The particular content of the C stage control register selects which of two translators 1–16 and 1–19 will receive the eight bits of the S control word for the purpose of controlling operation of the eight decision elements in block 1–11. Thus, a first set of two input AND gates $1–18_0$ to $1–18_7$ is provided for transferring in parallel the respective $S_0$ to $S_7$ bits from Control register 1–14 to the A translator 1–16 whenever the C stage has a particular bit value therein. For the purposes of this description, said particular bit value is assumed to be 0 (typically represented by a low electrical output from the storing stage) which, when inverted via an inverting logical element 1–20, conditions one input of each of the AND gates 1–18 for transference of signals therethrough. If any S stage contains a 1 bit value therein (typically represented by a high electrical output), then both inputs to the associated AND gate 1–18 are high so as to produce high output therefrom which is applied to the A translator 1–16. Of course, any 0 value bit in an S stage will maintain one input to the associated AND gate 1–18 at a low electrical condition to thereby maintain a low output indicative of a 0 value.

A second set of AND gates $1–22_0$ through $1–22_7$ is provided for alternatively passing the eight S bits from the Control register 1–14 to the B translator 1–19 during the function of permutation. This function is specified in the present system by a 1 value in the C stage which acts to generate a high output therefrom thus enabling one input to each AND gate 1–22. A high output from the C stage makes low the output of inverter 1–20 to thereby disable AND gates 1–18 from transferring the S control word to translator 1–16. With AND gates 1–22 now partially enabled by the 1 value in the C stage, 1 values in the S stages can pass through the appropriate AND gates 1–22 to appear as high 1 inputs to the B translator 1–19.

Each translator 1–16 and 1–19 has 64 output leads connected to the decision element arrangement 1–11 for the purpose of applying control signals thereto. The precise technique for generation of control signals on the outputs of translators 1–16 and 1–19, and their connection with the decision elements in block 1–11, will be described in subsequent paragraphs. The control signals from translator 1–16 may be conveniently identified as the A control signals, whereas those from translator 1–19 are identified as B control signals.

Figure 2:
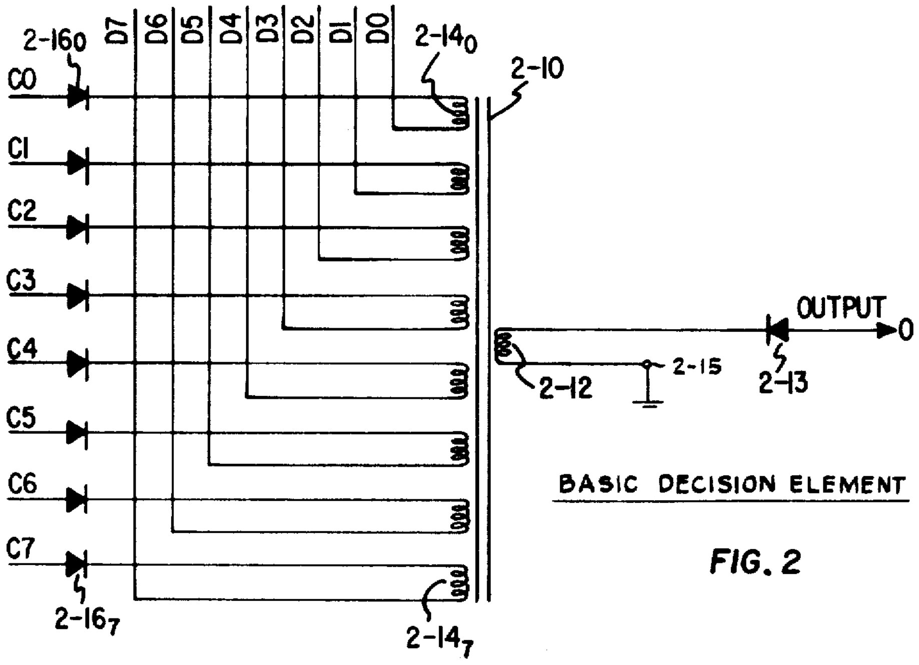
FIGS. 2 and 3 show alternative embodiments of the basic decision element employed in the system.
Figure 3:
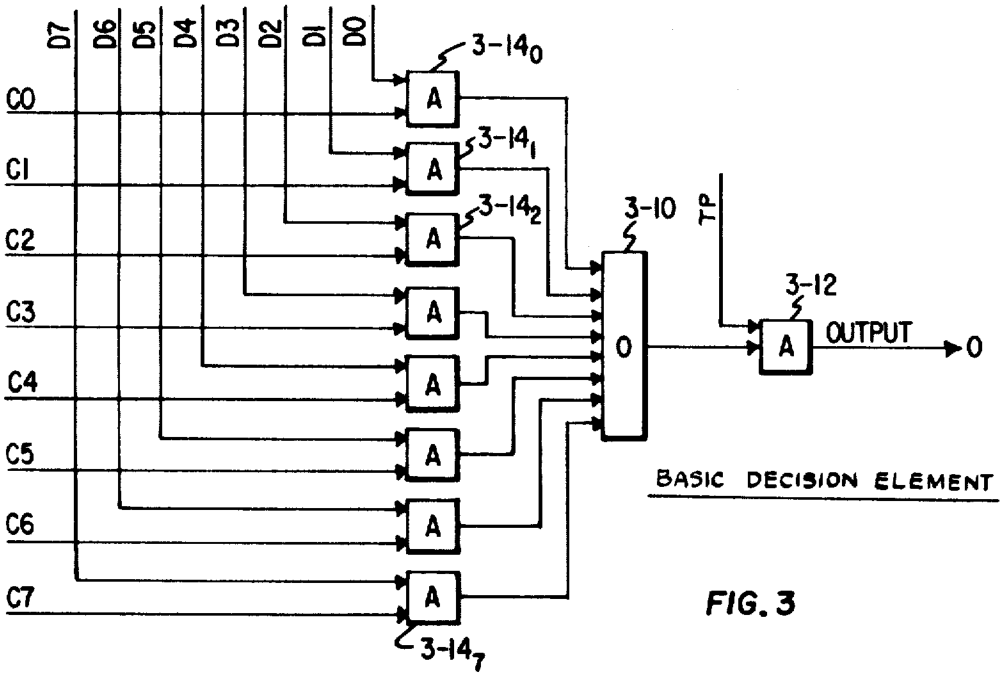

The basic decision element employed in the system is one providing at least a logical AND-OR function which may be mechanized in many different ways. FIGS. 2 and 3 show two alternative embodiments of the basic decision element, with FIG. 2 being preferred because of its constructional simplicity. FIG. 2 comprises an iron core transformer 2–10 with at least one output secondary winding 2–12, and with as many input primary windings 2–14 as there are bits in the input data word Y and control word S. Thus, in the disclosed embodiment of the invention there are eight primary windings $2\text{–}14_0$ through $2\text{–}14_7$. One end of winding 2–12 is connected via a diode 2–13 to an output terminal O while the other end thereof at terminal 2–15 is connected to ground. Each of the input primary windings 2–14 has one end thereof connected to an individual one of eight input data bit terminals $D_0$ through $D_7$, and the other end thereof connected via a diode 2–16 to an individual one of eight input control bit terminals $C_0$ through $C_7$. For example, input primary windings $2\text{–}14_0$ is connected between data bit terminal $D_0$ and control bit terminal $C_0$, whereas input winding $2\text{–}14_7$ is connected between data bit input terminal $D_7$ and control bit input terminal $C_7$.

Operation of FIG. 2 is as follows. The transformer core 2–10 and the mutual inductance of each winding with all other windings on the core provide an OR function between the input windings 2–14 and the output winding 2–12. As the mutual inductance of every input winding with the output winding is substantially the same, activation of an input winding will have the same effect upon the output winding as would the activation of any other input winding. An output signal is therefore induced in winding 2–12 for change of current in any of the input windings 2–14. Current flow is occasioned in any selected input winding 2–14 by completion of its current path coupled with application of a potential difference thereacross. For purposes of this discussion, it is assumed that current flow occurs in a selected input winding 2–14 whenever conditions representing 1 bit values exist at both of its ends so as to effect the AND logical function. For example, if a positive or high potential 1 bit value is applied to control input terminal $C_0$ concurrently with the grounding of data input terminal $D_0$ (1 bit value), current flow is initiated in winding $2\text{–}14_0$ so as to induce an output voltage in winding 2–12 whose polarity is such as to forward bias diode 2–13. On the other hand, if a low signal is applied to control input terminal $C_0$, or if terminal $D_0$ is open circuited or connected to a high potential, then no current flow occurs in winding $2\text{–}14_0$. The same logical operation is performed at each of the other input windings $2\text{–}14_1$ through $2\text{–}14_7$ relative to the ANDING of two information bits applied thereto. An output from winding 2–12 also occurs if there is current flow in any two or more input windings at the same time. Thus, the logical operation or function of the FIG. 2 decision element can be summarized by the following Boolean algebra equation, showing that an output signal O is obtained for the application of 1 value bits (represented in the equation by $D_0$, $C_0$, etc.) to the input terminals associated with any input winding:

$$(1)\quad O = D_0C_0 + D_1C_1 + D_2C_2 + D_3C_3 + D_4C_4 + D_5C_5 + D_6C_6 + D_7C_7$$

FIG. 3 is an alternative mechanization of the basic AND-OR decision element using electronic AND and OR gates of any well known variety. A single OR gate 3–10 has eight inputs thereto (for a matrix system operating upon the 8 bit data word Y), with a single output signal therefrom being gated via an AND gate 3–12 if the system environment so dictates. Inputs to OR gate 3–10 are applied from outputs of a set of AND gates 3–14 each of which in turn receives one input from a particular data word input terminal D and the other input from a particular control bit terminal C. Information 1 bit values (represented by high signals) applied to the two input terminals of each AND gate 2–14 thereupon cause an output therefrom which in turn produces an output from OR gate 3–10. The operation of FIG. 3 may therefore be represented by the same Boolean Equation 1 above as given for the circuit of FIG. 2.

Figure 4:
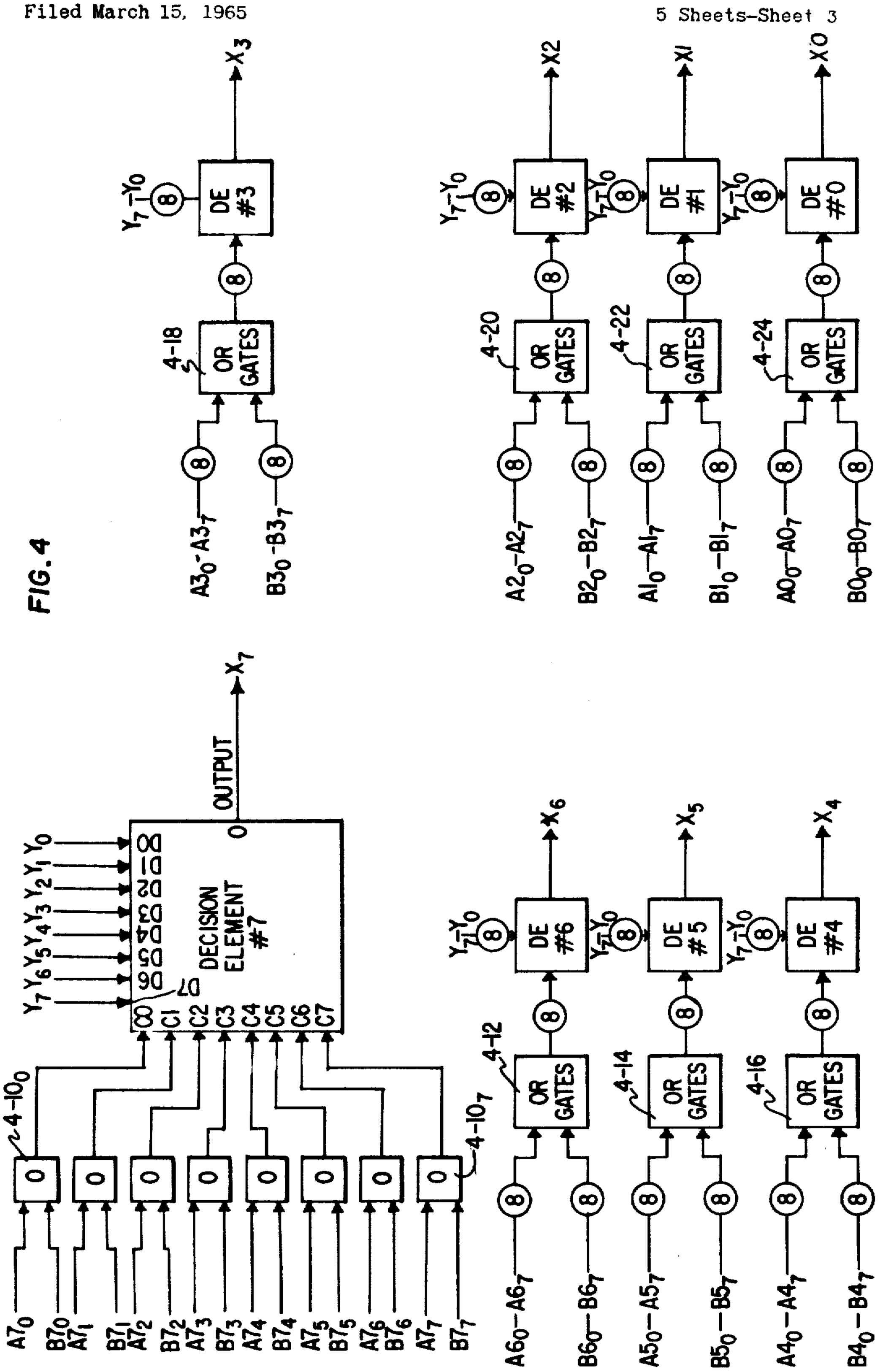
FIG. 4 shows the arrangement of and connections to the plural decision elements.

FIG. 4 is a block diagram showing the arrangement and connections to and from the eight decision elements of the matrix system. Said decision elements in FIG. 4 are identified by the respective numbers 0 through 7, with the details of each being as shown in FIG. 2, FIG. 3, or any other equivalent logical circuit. With particular reference now to decision element #7, it will be seen that the output terminal O therefrom is connected to stage $X_7$ of the Output register 1–12 in FIG. 1, such that the signal condition at the output of DE#7 represents the bit of position 7 of the X output word. For purposes of this description, it is here assumed that a high output from DE#7 is indicative of value 1, whereas a low output or absence of output is indicative of a 0 value.

Each of the eight data bit terminals $D_0$–$D_7$ to decision element 7 is connected to receive information bit values from the respective bit positions $Y_0$–$Y_7$ of the Input register 1–10 in FIG. 1. If the decision element structure of FIG. 2 is employed, then each Y stage of Input register 1–10 is arranged to connect the D terminal to ground when holding a 1 bit of the input data word. On the other hand, each Y stage produces a high electrical signal for value 1 when FIG. 3 is used. Other embodiments of the basic decision element may call for different construction of the Input register which will be well within the skill of those versed in the art.

Signals are applied to the control input terminals $C_0$–$C_7$ of decision element #7 from an individual one of a group of OR gates $4\text{–}10_0$ to $4\text{–}10_7$, respectively. Each OR gate 4–10 in turn has one input from the A translator 1–16 and a second input from the B translator 1–19. Each input lead to an OR gate 4–10 is identified by the letter A or B (representing a translator 1–16 or 1–19 from whence it comes), by the numeral 7 (representing the decision element #7), and by a subscript representing the particular control input terminal C to which the output of the OR gate 4–10 is connected. Thus, OR gate $4\text{–}10_0$ has its output connected to control input terminal $C_0$, and has two inputs $A7_0$ and $B7_0$ respectively coming from A translator 1–16 and B translator 1–19. Occurrence of a high or positive signal on either $A7_0$ or $B7_0$ causes a positive output from OR gate $4\text{–}10_0$, thus partially enabling the AND structure $2\text{–}14_0$ (FIG. 2) or $3\text{–}14_0$ (FIG. 3) of decision element #7.

The output from each of the other decision elements #0 through 6 in FIG. 4 is applied to a different one of the output register stages $X_0$ through $X_6$, respectively. Furthermore, the data input terminals $D_0$–$D_7$ of each also receive 1 or 0 value conditions from the respective stages $Y_0$–$Y_7$ of Input register 1–10. To simplify the drawing, the eight leads from the Y stages of the Input register to each decision element 0–6 have been shown as only one line with the encircled numeral 8 therein. Each decision element 0–6 further has an individual set of OR gates 4–12, 4–14, 4–16, etc., each set being comprised of eight OR gates like OR gates 4–10 of decision element #7. Each OR gate of a set has two inputs, one from the A translator 1–16 and one from the B translator 1–19, each said input being identified by the letter of the originating translator, the number of the decision element, and the number of the control terminal to which the OR gate is connected. This is the same arrangement as followed for OR gates 4–10. Thus, for example, the eight OR gates 4–12 connected to decision element #6 can be individually identified as 4–12$_0$, 4–12$_1$, 4–12$_2$, etc. respectively connected to control input terminals $C_0$, $C_1$, $C_2$, etc. of said decision element #6. OR gate 4–12$_0$ in turn receives one input from the A translator identified as A6$_0$, and a second input from the B translator identified as B6$_0$. The OR gate 4–12$_7$ in this set has its output connected to control input terminal $C_7$ of decision element #6, and receives one input A6$_7$ from translator A, and a second input labelled B6$_7$ from translator B. The eight leads from translator A and the eight leads from translator B to OR gates 4–12 are shown as single input lines in order to simplify the drawings.

It will thus be appreciated that each of the remaining sets of OR gates 4–14 through 4–24 have applied as inputs thereto eight leads from translator A and eight leads from translator B identified as shown in FIG. 4. Since there are eight decision elements, there must be a total of 64 leads from the A translator to FIG. 4 and 64 leads from the B translator to the FIG. 4. As will be appreciated, each lead from a translator is connected to only one OR gate within FIG. 4 and thereby to only one control input terminal of but one decision element.

Figure 5:
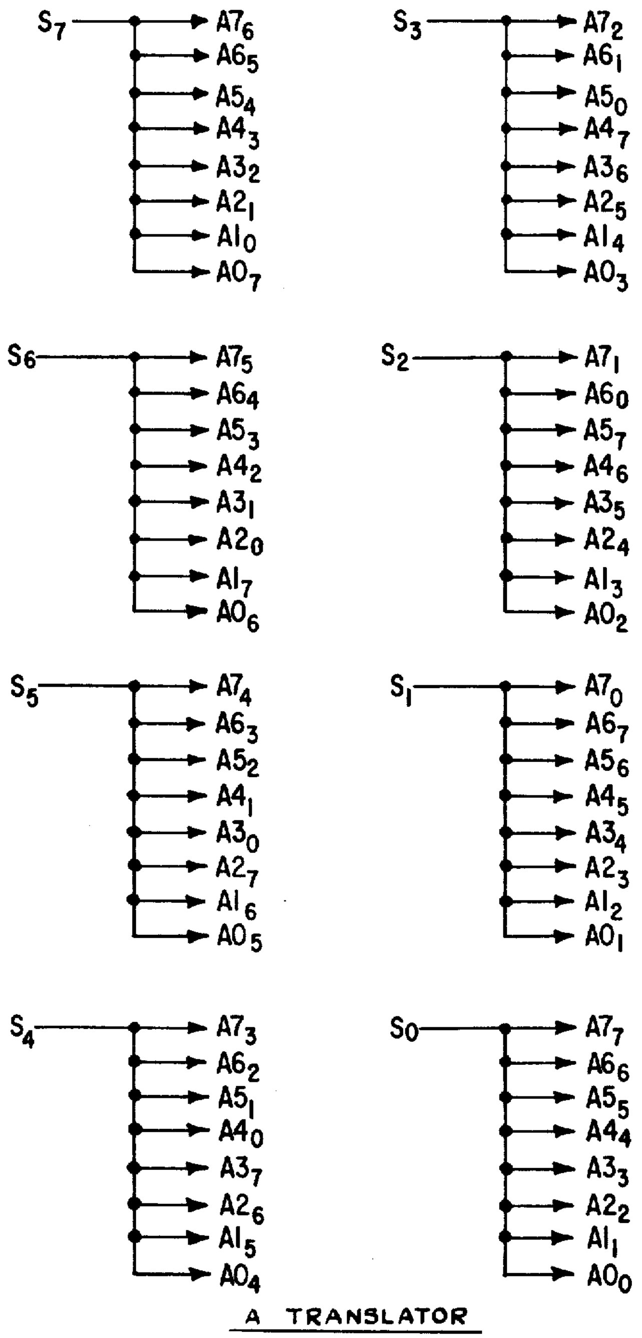
FIG. 5 is a circuit schematic of the A translator of the system.

FIG. 5 shows the composition of the A translator 1–16 of FIG. 1 for receiving the eight S signals from control register 1–14 and in turn for generating output signals on the 64 leads to the decision elements of FIG. 4. Translator A comprises nothing more than 8 output leads branched from each S input lead which is labelled to correspond to the stage in the Control register to which it is connected via AND gates 1–18. For example, the input lead labelled $S_0$ is branched into eight output leads each of which in turn is identified in the manner employed in FIG. 4. That is to say, each output lead in FIG. 5 is identified by the letter A, by a number identifying the particular decision element to which it is connected, and by a subscript identifying the control input terminal of that decision element. It will be seen that a high or positive signal appearing from stage $S_0$ in the Control register 1–14 (which is here taken to represent a 1 value therein) is simultaneously applied to eight output leads in FIG. 5 each of which goes to a different decision element in FIG. 4 and to a differently numbered control input terminal thereof. Said $S_0$ signal in particular is applied to the control input terminal $C_0$ of decision element #0, to $C_1$ of DE#1, to $C_2$ of DE#2, to $C_3$ of DE#3, etc. to $C_7$ of DE#7. In the case of input lead $S_1$ in FIG. 5, the signal thereon is simultaneously applied to $C_1$ of DE#0, to $C_2$ of DE#1, to $C_3$ of DE#2, etc. to $C_0$ of DE#7. As a further example, the input lead to FIG. 5 from stage $S_7$ is branched for connection to $C_7$ of DE#0, $C_0$ of DE#1, $C_1$ of DE#2, etc. to $C_6$ of DE#7. The remaining connections between the S stages and the decision elements via Translator A are conveniently shown in Table 1 below, where the intersection of each column (representing a decision element) and each row (representing a control input terminal) specifies the particular S stage connection.

TABLE 1.—DE INPUT #

| | 7 | 6 | 5 | 4 | 3 | 2 | 1 | 0 |
|---|---|---|---|---|---|---|---|---|
| 0 | $S_1$ | $S_2$ | $S_3$ | $S_4$ | $S_5$ | $S_6$ | $S_7$ | $S_0$ |
| 1 | $S_2$ | $S_3$ | $S_4$ | $S_5$ | $S_6$ | $S_7$ | $S_0$ | $S_1$ |
| 2 | $S_3$ | $S_4$ | $S_5$ | $S_6$ | $S_7$ | $S_0$ | $S_1$ | $S_2$ |
| 3 | $S_4$ | $S_5$ | $S_6$ | $S_7$ | $S_0$ | $S_1$ | $S_2$ | $S_3$ |
| 4 | $S_5$ | $S_6$ | $S_7$ | $S_0$ | $S_1$ | $S_2$ | $S_3$ | $S_4$ |
| 5 | $S_6$ | $S_7$ | $S_0$ | $S_1$ | $S_2$ | $S_3$ | $S_4$ | $S_5$ |
| 6 | $S_7$ | $S_0$ | $S_1$ | $S_2$ | $S_3$ | $S_4$ | $S_6$ | $S_6$ |
| 7 | $S_0$ | $S_1$ | $S_2$ | $S_3$ | $S_4$ | $S_5$ | $S_6$ | $S_7$ |

Figure 6:
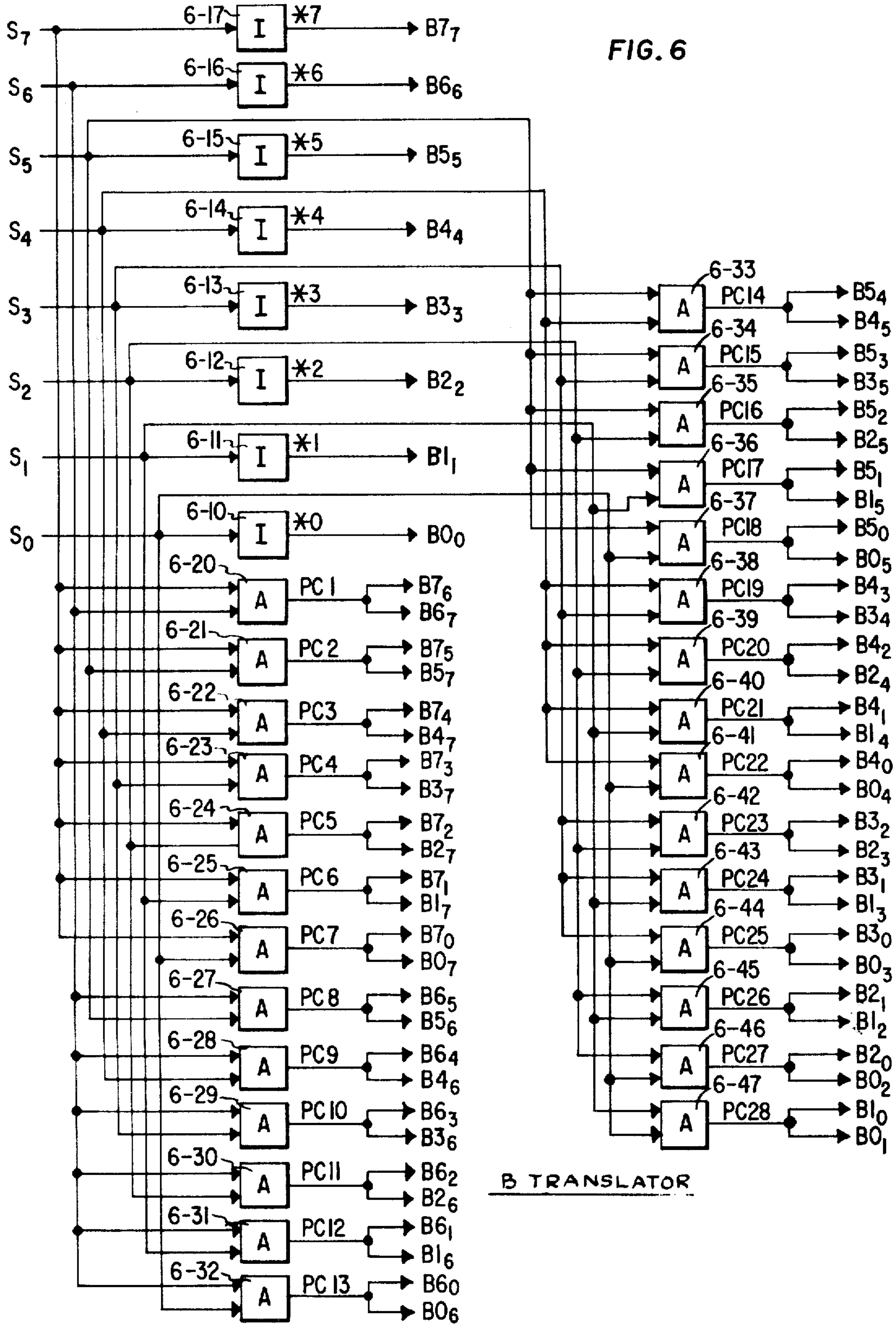
FIG. 6 is a circuit schematic of the B translator of the system.

FIGURE 6 shows details of the B translator 1–19 in FIG. 1, which is more complex than the simple A translator of FIG. 5. The eight bit word from the S stages of the Control register is only sent to FIG. 6 for the single function of permutation. As in FIG. 5 the eight input leads to FIG. 6 are identified by the S stages in the Control register to which they are connected via the AND gates 1–22. Each of the 64 output leads from FIG. 6 is identified in the manner shown in FIG. 4, i.e., by letter B, by the decision element number, and by a subscript identifying the control input terminal of that decision element. There are provided eight inverters 6–10 through 6–17, whose inputs are respectively connected to input leads $S_0$ through $S_7$, for complementing the signals appearing thereon. The outputs from these inverters, labelled as *0, *1, *2, etc. are applied to the indicated different decision elements in FIG. 4 and to different control input terminals thereof. For example, the output *0 from inverter 6–10 is applied to the control input terminal $C_0$ of decision element #0, and the output *7 of inverter 6–17 is applied to $C_7$ of decision element #7. A high input signal to any inverter (here representing a 1 value in the indicated S stage) causes a low output from said inverter indicative of a 0 value, and vice-versa, hence $*0=\bar{S}_0$, $*1=\bar{S}_1$, etc.

Twenty-eight AND gates 6–20 through 6–47 are also in the B translator of FIG. 6. Each said AND gate has its output, identified by a PC (permutation count) number, branched to two leads going to FIG. 4, and has two inputs thereto from two S stages. The pair of S inputs to each AND gate in FIG. 6 is unique, and later it will be appreciated that for an eight bit S control word, there are twenty-eight different pairs of bit combinations from said word. AND gate 6–20, for example, has inputs from $S_7$ and $S_6$ and is the only AND gate in FIG. 6 so connected. The output from AND gates 6–20, labelled PC1, is branched into two output leads each identified by the originating translator (B), a decision element and a control input terminal. AND gate 6–20 is therefore seen to have its output, defined in a Boolean algebra expression as $PC1=S_7S_6$, applied to control input terminal $C_7$ of decision element #6, and to control input terminal $C_6$ of decision element #7.

Each of the AND gates 6–21 through 6–26 has one input thereof connected to $S_7$, and the other input connected to a respective one of the input leads $S_5$ through $S_0$. Each output of AND gates A6–21 to A6–26, respectively labelled PC2–PC7, is branched to two output leads from translator B which in turn are connected in FIG. 4 to the indicated decision elements and control input terminals, hence $PC2=S_7S_5$, $PC_3=S_7S_4$, etc. The remaining connections between the outputs of AND gates 6–27 through 6–47 (identified by PC numbers) and the decision elements is conveniently shown by Table 2 below, which is organized in the fashion of Table 1.

TABLE 2.—DE#

| | 7 | 6 | 5 | 4 | 3 | 2 | 1 | 0 |
|---|---|---|---|---|---|---|---|---|
| 0 | 7 | 13 | 18 | 22 | 25 | 27 | 28 | *0 |
| 1 | 6 | 12 | 17 | 21 | 24 | 26 | *1 | 28 |
| 2 | 5 | 11 | 16 | 20 | 23 | *2 | 26 | 27 |
| 3 | 4 | 10 | 15 | 19 | *3 | 23 | 24 | 25 |
| 4 | 3 | 9 | 14 | *4 | 19 | 20 | 21 | 22 |
| 5 | 2 | 8 | *5 | 14 | 15 | 16 | 17 | 18 |
| 6 | 1 | *6 | 8 | 9 | 10 | 11 | 12 | 13 |
| 7 | *7 | 1 | 2 | 3 | 4 | 5 | 6 | 7 |

*Operation*

(1) *Right circular shift.*—The purpose of a right circular shift function is as follows. The eight bit input data word entered into stages Y of the Input register 1–10 is effectively shifted right and end-around a number of places as determined by the location of a single 1 bit value in control register stages $S_0$ through $S_7$ and entered into output register 1–12. The shifting takes place as the data moves through the decision elements 1–11 so that the output register 1–12 contains the shifted form of the input data word. Stage C of control register 1–14 contains a 0 value so as to enable only AND gates 1–18 to pass the eight bit S control word to translator A.

From an examination of FIGS. 4 and 5, and Table 1, the following eight Boolean Equations 2 through 9 may be evolved for showing the value of each X output bit according to the values of the Y input bits and the values of the S control bits.

$$(2)\quad X_0=Y_7S_7+Y_6S_6+Y_5S_5+Y_4S_4+Y_3S_3+Y_2S_2+Y_1S_1+Y_0S_0$$

$$(3)\quad X_1=Y_7S_6+Y_6S_5+Y_5S_4+Y_4S_3+Y_3S_2+Y_2S_1+Y_1S_0+Y_0S_7$$

$$(4)\quad X_2=Y_7S_5+Y_6S_4+Y_5S_3+Y_4S_2+Y_3S_1+Y_2S_0+Y_1S_7+Y_0S_6$$

$$(5)\quad X_3=Y_7S_4+Y_6S_3+Y_5S_2+Y_4S_1+Y_3S_0+Y_2S_7+Y_1S_6+Y_0S_5$$

$$(6)\quad X_4=Y_7S_3+Y_6S_2+Y_5S_1+Y_4S_0+Y_3S_7+Y_2S_6+Y_1S_5+Y_0S_4$$

$$(7)\quad X_5=Y_7S_2+Y_6S_1+Y_5S_0+Y_4S_7+Y_3S_6+Y_2S_5+Y_1S_4+Y_0S_3$$

$$(8)\quad X_6=Y_7S_1+Y_6S_0+Y_5S_7+Y_4S_6+Y_3S_5+Y_2S_4+Y_1S_3+Y_0S_2$$

$$(9)\quad X_7=Y_7S_0+Y_6S_7+Y_5S_6+Y_4S_5+Y_3S_4+Y_2S_3+Y_1S_2+Y_0S_1$$

In the above Equations 2 through 9, the subscript of the S stage wherein is located the single 1 value actually represents the number of positions through which the input data word Y is to be shifted right. For example, if a shift of three places is to be executed, only $S_3$ of the control register is set to a 1 value. All other stages $S_0$ through $S_2$, and $S_4$ through $S_7$ are set with a 0 value. In the A translator 1–16 shown in FIG. 5, only input lead $S_3$ thus has a high signal thereon which in turn is applied to the eight A output leads there indicated. In FIG. 4, this high $S_3$ signal is applied to control input terminals 3, 4, 5, 6, 7, 0, 1, and 2 of respective decision elements #0, 1, 2, 3, 4, 5, 6, and 7. Using the decision element configuration of FIG. 3 for the purpose of explaining this example, the following logical operations occur in each of the decision elements 0 through 7. In decision element #0, the high input at terminal C3 to AND gate 3–14$_3$ permits the value of the Y3 bit at terminal $D_3$ to be transferred to stage $X_0$ of the output register, thus representing a shift of the bit value in position $Y_3$ three places to the right to position $X_0$. In decision element #1, the high signal at $C_4$ permits AND gate 3–14$_4$ to transfer the bit value in input stage $Y_4$ to output stage $X_1$, also a three place right shift. In decision element #2, the high signal to $C_5$ transfers $Y_5$ to $X_2$. High control signals to control input terminals $C_6$ and $C_7$ of respective decision elements #3 and 4 permit a right shift by three places of respective inputs $Y_6$ and $Y_7$ to respective outputs $X_3$ and $X_4$. In decision element #5, the high signal to $C_0$ thereby transfers the bit in stage $Y_0$ to output stage $X_5$, representing a right circular or end around shift of three places from input stage $Y_0$ through output stages $X_7$, $X_6$, and to $X_5$ of register 1–12. Similarly, decision element #6 has a high signal applied to $C_1$ which in turn transfers $Y_1$ to $X_6$. Decision element #7, by virtue of the high signal at its input terminal $C_2$, transfers the bit value in $Y_2$ into output stage $X_7$. All said bit transfers from the Input register 1–10 to the Output register 1–12 take place simultaneously in a unit time interval of operation.

Although Translator A of FIGURE 5 is constructed for only a right, rather than left, circular shift, it should be appreciated that equivalent structure can be devised for the latter function by those versed in the art.

(2) *Pattern location.*—The pattern location mode of operation is best explained by the description of a concrete example. Suppose, for example, that the true value of the input data word under analysis is $Y_7=1$, $Y_6=1$, $Y_5=0$, $Y_4=1$, $Y_3=1$, $Y_2=0$, $Y_1=0$, $Y_0=1$; hence word $Y=11011001$. Actually, for the pattern location function the complement of word Y is placed into the input register 1–10, or alternatively, the above true value of word Y is put into register 1–10 and then inverted (by gates not shown in FIG. 1) to effectively apply an input data word $\overline{Y}=00100110$ to the decision elements. The lower numbered control register stages S are now set to the pattern to be investigated, and the C stage thereof is set to 0 for selecting the A translator 1–16. Assume the control pattern to xxxxx1x1, where each "*x*" represents a bit position of the Y word whose value is irrelevant to the problem and thus is to be ignored. This means that stages $S_0$ and $S_2$ are set to 1 values, while stages $S_1$, $S_3$, $S_4$, $S_5$, $S_6$, and $S_7$ are set to 0 values, thus $S=00000101$.

Before describing the circuit operation with the above assumed values, the significance of the control pattern will first be explained. The control pattern *xxxxx*1*x*1 is compared against the input data word Y in order to find in the latter the location of each combination of any three adjacent bit positions wherein the two outermost bit positions contain 1 values. "Adjacent" is defined to be met by position combinations such as $Y_0$–$Y_1$–$Y_2$, $Y_1$–$Y_2$–$Y_3$, $Y_2$–$Y_3$–$Y_4$, $Y_3$–$Y_4$–$Y_5$, etc. as well as by combinations such as $Y_6$–$Y_7$–$Y_0$ and $Y_7$–$Y_0$–$Y_1$. Thus, in an 8 bit data word there are a total of eight such combinations. In comparing the here assumed control pattern against the here assumed true Y values, it will therefore be seen that only the two combinations of $Y_4$–$Y_5$–$Y_6$ and $Y_6$–$Y_7$–$Y_0$ meet this control pattern requirement, since outermost stages $Y_4$ and $Y_6$ in the first combination both contain 1 values, as do the outermost stages $Y_6$ and $Y_0$ in the second combination.

The circuits operate in the following manner to provide an indication of the location of these Y stage combinations wherein the desired pattern is found. A look will first be taken for the effect of the 1 bits in $S_0$ and $S_2$ upon the output to $X_0$ of decision element #0 for the $\overline{Y}$ values applied thereto. The control stages $S_0$ and $S_2$ are respectively connected, via the A Translator of FIG. 5, to control input terminals C0 and C2 of said decision element #0. Using FIG. 3, it is seen that high signals to $C_0$ and $C_2$ enable only AND gates 3–14$_0$ and 3–14$_2$ to pass the respective values of $\overline{Y}_0$ and $\overline{Y}_2$ to $X_0$. Since $\overline{Y}_0=0$ (because the true value of $Y_0=1$) will be no high output from AND gate 3–14$_0$. However, since $\overline{Y}_2=1$ (because the true value of $Y_2=0$), the output of AND gate 3–14$_2$ is high, thereby making high the output of OR gate 3–10 to set $X_0=1$. The Boolean equation for this result is as follows:

$$X_0=\overline{Y}_0+\overline{Y}_2=0+1=1$$

The value of $X_1$ will now be from the effect of the 1 bits in $S_0$ and $S_2$ on decision element #1. The high outputs of $S_0$ and $S_2$ are applied by way of FIG. 5 (the A Translator) to control input terminals C1 and C3 of decision element #1. AND gates 3–14$_1$ and 3–14$_3$ are therefore respectively enabled to respond to $\overline{Y}_1$ (of value 1) and $\overline{Y}_3$ (of value 0). The high output of AND gate 3–14$_1$ therefore makes high the output of OR gate 3–10 to set $X_1=1$.

Thus:

$$X_1=\overline{Y}_1+\overline{Y}_3=1+0=1$$

By a similar analysis, the values of $X_2$ through $X_7$ are seen to be as follows:

$$X_2=\overline{Y}_2+\overline{Y}_4=1+0=1$$
$$X_3=\overline{Y}_3+\overline{Y}_5=0+1=1$$
$$X_4=\overline{Y}_4+\overline{Y}_6=0+0=0$$
$$X_5=\overline{Y}_5+\overline{Y}_7=1+0=1$$
$$X_6=\overline{Y}_6+\overline{Y}_0=0+0=0$$
$$X_7=\overline{Y}_7+\overline{Y}_1=0+1=1$$

Each X bit of 0 value indicates a "find," or in other words, indicates the appearance of the pattern being investigated and further marks the location of the rightmost Y stage holding said pattern. Furthermore, the location of the 0 value X bit also indicates the number of right circular shifts which could be performed upon the Y word in order to place each appearance of the pattern into the same numbered positions as contain the control pattern in the control register. Thus, for the assumed true Y word given above, four shifts thereof to the right would place 1 values in stages $Y_0$ and $Y_2$ corresponding to the stages $S_0$ and $S_2$ in which are found the 1's of the control pattern. This number of shifts is indicated by the 0 bit in output stage $X_4$, with the subscript of said output stage indicating said four shifts. A shift of 6 spaces to the right of the true Y word would likewise place its 1 values into stages $Y_0$ and $Y_2$, as indicated by the 0 bit held in $X_6$ of the output register.

(3) *Coincidence detection.*—Coincidence detection is a comparison of an 8 bit S word with all shifted forms of the 8 bit Y word. It is performed in the matrix system by forming the "exclusive OR" between the S word and all shifted forms of the Y word in every bit location. In general, the true word Y is first applied to the decision elements along with the complement of word S. At the end of this operation the output register contains half of the "exclusive OR" result. The second and final step of the coincidence detection operation is to now apply the complement form of Y and the true form of S to the decision elements. At the conclusion of this second step, and X stage which is still in its unset or 0 condition indicates a coincidence of word S with a right circular shift form of Y by a number of places equal to the position of said 0 bit X stage. Thus, the coincidence detection mode of operation performed in this manner requires two units of time. To perform this mode of operation in a single unit of time would require two groups of 8 decision elements each, with their respective outputs "OR"ed to the output register. In such a larger system, one group of decision elements would receive true S and complement Y values, while the other group of decision elements would simultaneously receive complement S and true Y values.

As a specific example of this coincidence detection function assume a value of $Y=10111001$ and the true value of $S=11100110$. Hence, the complement value $\overline{Y}=01000110$ and the complement $\overline{S}$ value$=00011001$. It will immediately be observed that a right circular shift of the true Y value would result in 11100110 and hence produce a perfect coincidence, bit for bit, with the true value of S. During the first of operating time, the true Y value is applied to the decision elements and the $\overline{S}$ value is also applied thereto via Translator A of FIG. 5. Assume said complemented $\overline{S}$ value is placed into the control register such that stages $S_7=0$, $S_6=0$, $S_5=0$, $S_4=1$, $S_3=1$, $S_2=0$, $S_1=0$ and $S_0=1$, whereas stages $Y_7=1$, $Y_6=0$, $Y_5=1$, $Y_4=1$, $Y_3=1$, $Y_2=0$, and $Y_0=1$. Only input leads $S_0$, $S_3$, and $S_4$ in FIG. 5 are high. Therefore, in decision element #0, only AND gates 3–14$_0$, 3–14$_3$, and 3–14$_4$ (FIG. 3) are enabled to respectively sample the values of $Y_0$, $Y_3$, and $Y_4$. Since at least one of these Y bits is equal to 1 (actually all three are) then $X_0=1$. Thus, $$X_0=Y_0+Y_3+Y_4=1+1+1=1$$

A similar analysis of the operation in each of the remaining decision elements #1 through #7 (for only $S_0$, $S_3$, and $S_4=1$, and with application of the true Y value), is conveniently represented as follows:

$$X_1=Y_1+Y_4+Y_5=0+1+1=1$$
$$X_2=Y_2+Y_5+Y_6=0+1+0=1$$
$$X_3=Y_3+Y_6+Y_7=1+0+1=1$$
$$X_4=Y_4+Y_7+Y_0=1+1+1=1$$
$$X_5=Y_5+Y_0+Y_1=1+1+0=1$$
$$X_6=Y_6+Y_1+Y_2=0+0+0=0$$
$$X_7=Y_7+Y_2+Y_3=1+0+1=1$$

Although in the instant assumed example only $X_6=0$ at the end of the first unit of operating time, thus giving the correct answer of six position shift of Y for coincidence with S, the second unit of operating time must always be taken in order to be assured of a correct answer, since with some Y and S words a 0 value in a particular X stage at the end of the first operating time unit might be changed to a 1 value for said X stage at the end of the second unit of operating time. Thus, the true value of S is now entered into the control register and applied via FIG. 5 to the decision elements, while the complement $\overline{Y}$ value is entered into the input register. Specifically, $S_7=1$, $S_6=1$, $S_5=1$, $S_4=0$, $S_3=0$, $S_2=1$, $S_1=1$, and $S_0=0$, whereas $\overline{Y}_7=0$, $\overline{Y}_6=1$, $\overline{Y}_5=0$, $\overline{Y}_4=0$, $\overline{Y}_3=0$, $\overline{Y}_2=1$, $\overline{Y}_1=1$, and $\overline{Y}_0=0$. The Boolean equations for the X outputs are as follows:

$$X_0=\overline{Y}_1+\overline{Y}_2+\overline{Y}_5+\overline{Y}_6+\overline{Y}_7=1+1+0+1+0=1$$
$$X_1=\overline{Y}_2+\overline{Y}_3+\overline{Y}_6+\overline{Y}_7+\overline{Y}_0=1+0+1+0+0=1$$
$$X_2=\overline{Y}_3+\overline{Y}_4+\overline{Y}_7+\overline{Y}_0+\overline{Y}_1=0+0+0+0+1=1$$
$$X_3=\overline{Y}_4+\overline{Y}_5+\overline{Y}_0+\overline{Y}_1+\overline{Y}_2=0+0+0+1+1=1$$
$$X_4=\overline{Y}_5+\overline{Y}_6+\overline{Y}_1+\overline{Y}_2+\overline{Y}_3=0+1+1+1+0=1$$
$$X_5=\overline{Y}_6+\overline{Y}_7+\overline{Y}_2+\overline{Y}_3+\overline{Y}_4=1+0+1+0+0=1$$
$$X_6=\overline{Y}_7+\overline{Y}_0+\overline{Y}_3+\overline{Y}_4+\overline{Y}_5=0+0+0+0+0=0$$
$$X_7=\overline{Y}_0+\overline{Y}_1+\overline{Y}_4+\overline{Y}_5+\overline{Y}_6=0+1+0+0+1=1$$

Consequently, at the end of the second unit of time, only stage $X_6$ of the output register still remains "unset," i.e. contains a 0 value thus showing or indicating that word Y requires a right circular shift of 6 places in order to match the S word perfectly.

(4) *Permutation.*—The matrix system operating in the permutation mode exchanges any selected pair of digits in the 8 bit Y word, with the result appearing at the output register. For the purposes of illustration only, let the original input word Y be comprised of 8 bits each of value 0 or 1, which are respectively identified as to their initial position by the first 8 letters of the alphabet. Thus, in position $Y_7$ there is a bit (of value 0 or 1) which is identified by the letter A; in $Y_6$ there is a bit identified by letter B; in $Y_5$ a bit identified by letter C; $Y_4$ holds a bit identified by D; position $Y_3$ holds a bit identified by letter E; $Y_2$ holds a bit identified by F; $Y_1$ holds a bit identified by G; and bit position $Y_0$ holds a bit identified by H. Thus, the original data input word is comprised of bits identified as ABCDEFGH respectively held in stages $Y_7$–$Y_0$.

For any input data word having M number of bits, there exists a number of different permutations equal to:

$$\sum_{p=1}^{M-1} p$$

Therefore, for an 8 bit Y word there are $$\sum_{p=1}^{8-1} p=1+2+3+4+5+6+7=28$$

different permutations excluding the arrangement of the bits in the original Y word. The following Table 3 illustrates in column (*a*) the different permutations, using the eight letters identifying bits of the original word. Also shown is (*b*) a decimal count identifying each permutation, (*c*) content of the S stages of the control register necessary to create the specified permutation and (*d*) its Boolean counterpart.

TABLE 3

| (a) Different Permutations $X_7X_6X_5X_4X_3X_2X_1X_0$ | (b) Permutation Count | (c) Control Register Input $S_7S_6S_5S_4S_3S_2S_1S_0$ | (d) Boolean Count Expression |
|---|---|---|---|
| B A C D E F G H | 1 | 1 1 0 0 0 0 0 0 | $S_7S_6$ |
| C B A D E F G H | 2 | 1 0 1 0 0 0 0 0 | $S_7S_5$ |
| D B C A E F G H | 3 | 1 0 0 1 0 0 0 0 | $S_7S_4$ |
| E B C D A F G H | 4 | 1 0 0 0 1 0 0 0 | $S_7S_3$ |
| F B C D E A G H | 5 | 1 0 0 0 0 1 0 0 | $S_7S_2$ |
| G B C D E F A H | 6 | 1 0 0 0 0 0 1 0 | $S_7S_1$ |
| H B C D E F G A | 7 | 1 0 0 0 0 0 0 1 | $S_7S_0$ |
| A C B D E F G H | 8 | 0 1 1 0 0 0 0 0 | $S_6S_5$ |
| A D C B E F G H | 9 | 0 1 0 1 0 0 0 0 | $S_6S_4$ |
| A E C D B F G H | 10 | 0 1 0 0 1 0 0 0 | $S_6S_3$ |
| A F C D E B G H | 11 | 0 1 0 0 0 1 0 0 | $S_6S_2$ |
| A G C D E F B H | 12 | 0 1 0 0 0 0 1 0 | $S_6S_1$ |
| A H C D E F G B | 13 | 0 1 0 0 0 0 0 1 | $S_6S_0$ |
| A B D C E F G H | 14 | 0 0 1 1 0 0 0 0 | $S_5S_4$ |
| A B E D C F G H | 15 | 0 0 1 0 1 0 0 0 | $S_5S_3$ |
| A B F D E C G H | 16 | 0 0 1 0 0 1 0 0 | $S_5S_2$ |
| A B G D E F C H | 17 | 0 0 1 0 0 0 1 0 | $S_5S_1$ |
| A B H D E F G C | 18 | 0 0 1 0 0 0 0 1 | $S_5S_0$ |
| A B C E D F G H | 19 | 0 0 0 1 1 0 0 0 | $S_4S_3$ |
| A B C F E D G H | 20 | 0 0 0 1 0 1 0 0 | $S_4S_2$ |
| A B C G E F D H | 21 | 0 0 0 1 0 0 1 0 | $S_4S_1$ |
| A B C H E F G D | 22 | 0 0 0 1 0 0 0 1 | $S_4S_0$ |
| A B C D F E G H | 23 | 0 0 0 0 1 1 0 0 | $S_3S_2$ |
| A B C D G F E H | 24 | 0 0 0 0 1 0 1 0 | $S_3S_1$ |
| A B C D H F G E | 25 | 0 0 0 0 1 0 0 1 | $S_3S_0$ |
| A B C D E G F H | 26 | 0 0 0 0 0 1 1 0 | $S_2S_1$ |
| A B C D E H G F | 27 | 0 0 0 0 0 1 0 1 | $S_2S_0$ |
| A B C D E F H G | 28 | 0 0 0 0 0 0 1 1 | $S_1S_0$ |

It will be noted that columns (*b*) and (*d*) of Table 3 in effect describe the S stage connections to AND gates 6–20 through 6–47 of FIG. 6 (Translator B). The permutation BACDEFGH identified by decimal count 1 is shown to differ from the original Y input word

ABCDEFGH in that the bits AB originally in positions $Y_7$ and $Y_6$ become interchanged as BA when they appear at the output register. The 1 values required in the control register to effect such a permutation change are shown in column (*c*) of Table 3 as being in $S_7$ and $S_6$, with the remaining S stages being set to 0. As another example, the permutation AECDBFGH given the decimal count of 10 is identical to the original Y input word except that the B and E bits originally in $Y_6$ and $Y_3$ now respectively appear in positions $X_3$ and $X_6$ of the output register. This permutation is performed in response to 1 bits appearing in $S_6$ and $S_3$ of the control register. Thus, it will be seen that the location of the two 1 bits in the control register signify the two positions of the input word which are to have their bits interchanged.

As has been previously mentioned, the B Translator 1–19 is used for the permutation function rather than A translator 1–16. The function of FIG. 6 (the B Translator) is, upon receipt of the 8 bit S word, to generate appropriate control signals for the decision elements such that those Y bits not involved in the exchange are transferred directly to the corresponding X positions of the output register, while those two Y bits to be interchanged are transferred to the output register in transposed form. For example, assume that the S register contains 1 bits in $S_4$ and $S_2$ requiring an interchange of bits of the corresponding $Y_4$ and $Y_2$ positions, hence ABCDEFGH is to be changed to ABCFEDGH. This particular permutation has been given the permutation count of 20 in Table 3 above. Referring to FIG. 6 and also to Table 2, it is seen that the high signal from AND gate 6–39 (PC20) is applied to control input element $C_4$ of decision element #2 and to control input terminal $C_2$ of decision element #4. Thus, there is a gate through of the bit in $Y_4$ to $X_2$ and of the bit in $Y_2$ position to $X_4$ position. The high control signals for the remaining decision elements #0, 1, 3, 5, 6, and 7 are applied to control input terminals thereof according to the location of their "*" counts shown in Table 2. For example, the count *0 in Table 2 indicates that a high input is applied to the control input terminal $C_0$ of decision element #0 which in turn transfers the bit in $Y_0$ to $X_0$. Similarly, count *1 in Table 2 indicates application of a high control signal applied to control input terminal C1 of decision element #1 to effect transfer of $Y_1$ to $X_1$. Similar functions of $Y_3$ to $X_3$, $Y_5$ to $X_5$, $Y_6$ to $X_6$, and $Y_7$ to $X_7$ occur in decision elements #3, 5, 6, and 7 as shown by the location of respective counts *3, *5, *6, and *7.

To illustrate the permutation operation of the matrix using concrete numbers, assume now that the original Y word=10110011 such that $Y_2=0$ and $Y_4=1$; that S=00010100 (permutation count of 20) such that only $S_2=1$ and $S_4=1$; and that the C stage of the control register is set to 1 for permitting transfer of the S control bits to Translator B (FIG. 6). In FIG. 6, therefore, the high signal input leads are $S_2$ and $S_4$. This makes low the outputs of leads $B2_2$, and $B4_4$, whereas leads $B0_0$, $B1_1$, $B3_3$, $B5_5$, and $B7_7$ remain high thus representing the presence of the "asterisk" counts *0, *1, *3, *5, *6, and *7 in Table 2. Of the AND gates in FIG. 6, only 6–39 has a high output thus making high the leads $B4_2$ and $B2_4$.

The effect on the decision elements can be summarized as follows. Decision element #0 receives a high signal only at its $C_0$ control input terminal via $B0_0$ from inverter 6–10. This permits AND gate 3–14$_0$ therein (FIG. 3) to transfer the $Y_0$ value to $X_0$ without change. Thus, $$X_0=Y_0=1$$

Similarly, decision element #1, by receiving a high signal only at its $C_1$ control input terminal from lead $B1_1$, transfers the bit in $Y_1$ to $X_1$ so that $$X_1=Y_1=1$$

In decision element #2, the high signal on lead $B2_4$ from AND gate B–39 (FIG. 6) causes AND gate 3–14$_4$ to transfer $Y_4$ to $X_2$. Hence, $$X_2=Y_4=1$$

In decision element #3, the high $B3_3$ signal thereto makes $$X_3=Y_3=0$$

In decision element #4, the high $B4_2$ signal thereto from AND gate 6–39 in FIG. 6 makes $$X_4=Y_2=0$$

and in decision elements #5, 6, and 7 the respectively high $B5_5$, $B6_6$, and $B7_7$ signals are used so that $$X_5=Y_5=1$$
$$X_6=Y_6=0$$
$$X_7=Y_7=1$$

Thus, the output word X has a value of 10100111 rather than the input Y value of 10110011, the difference lying in the transposition of the position 2 and position 4 bits.

While preferred embodiments of the invention have been shown and described, various modifications of same will be apparent to those skilled in the art without departure from the novel features defined in the appended claims.

The embodiments of the invention in which an exclusive property or privilege is claimed are defined as follows:

1. A logical matrix system comprising:
   (a) N OR elements, N being an integer greater than one;
   (b) N AND element groups, each group being comprised of N AND elements which in turn are connected as inputs to a respective said OR element;
   (c) N data bit channels each connected as a first input to one AND element in each said group; and
   (d) N control bit channels each connected as a second input to one AND element in each said group such that all of the AND elements to which is connected the same control bit channel are each in turn connected with a different data bit channel.

2. A system according to claim 1 wherein each said OR element and its input AND element group comprise a transformer with N primary input windings and at least one secondary output winding.

3. A logical matrix system comprising:
(a) N OR elements, N being an integer greater than one;
(b) N AND element groups, each group being comprised of N first AND elements which in turn are connected as inputs to a respective said OR element;
(c) N data bit channels each connected as a first input to one first AND element in each said group;
(d) N control bit channels each connected as an inverted second input to but one different first AND element in each said group, where each said one different first AND element is connected with a different data bit channel; and
(e) a plurality of second AND elements each connected with inputs from a different pair of said control bit channels, and each said second AND element being connected as a second input to one first AND element in each of two of said groups where each said one first AND element of a said two groups is connected with a different data bit channel.

4. A system according to claim 3 wherein each said OR element and its input AND element group comprise a transformer with N primary input windings and at least one secondary output winding.

5. A logical matrix system comprising:
(a) N OR elements, N being an integer greater than one;
(b) N AND element groups, each group being comprised of N first AND elements which in turn are connected as inputs to a respective said OR element;
(c) N data bit channels each connected as a first input to one first AND element in each said group;
(d) N first control bit channels each connected as a second input to one first AND element in each said group such that all of the first AND elements to which is connected the same first control bit channel are each in turn connected with a different data bit channel;
(e) N second control bit channels each connected as an inverted said second input to but one different first AND element in each said group, where each said one different first AND element is connected with a different data bit channel; and
(f) a plurality of second AND elements each connected with inputs from a different pair of said second control bit channels, each said second AND element being connected as a said second input to one first AND element in each of two of said groups, where each said one first AND element of a said two groups is connected with a different data bit channel.

6. A system according to claim 5 wherein is further included N input control bit channels selectively connectable either to said first control bit channels or to said second control bit channels.

7. A system accordingly to claim 5 wherein each said OR element and its input AND element group comprise a transformer with N primary input windings and at least one secondary output winding.

8. A logical matrix system comprising:
(a) $N+1$ OR element numbered from 0 to N;
(b) $N+1$ correspondingly numbered AND element groups, each numbered group being connected as inputs to the correspondingly numbered OR element and being comprised of $N+1$ correspondingly numbered AND elements;
(c) $N+1$ correspondingly numbered data bit channels, each numbered data bit channel being connected as a first input to the correspondingly numbered AND element in each said numbered group; and
(d) N+1 correspondingly numbered control bit channels, each numbered control bit channel being connected as a second input to one AND element in each said numbered group, where each said one AND element is identified by a number equal to the sum of its group and connected control channel numbers using modulo $N+1$.

9. A system according to claim 8 wherein each said numbered OR element and the correspondingly numbered AND element group comprise a transformer with $N+1$ primary input windings and at least one secondary output winding.

10. A logical matrix system comprising:
(a) $N+1$ OR elements numbered from 0 to N;
(b) $N+1$ correspondingly numbered AND element groups, each numbered group being connected as inputs to the correspondingly numbered OR element and being comprised of $N+1$ correspondingly numbered first AND elements;
(c) $N+1$ correspondingly numbered data bit channels, each numbered data bit channel being connected as a first input to the correspondingly numbered first AND element in each said numbered group;
(d) $N+1$ correspondingly numbered control bit channels, each numbered control bit channel being connected as an inverted second input to the correspondingly numbered first AND element in the correspondingly numbered group; and
(e) a $$\sum_{n=1}^{N} n$$

plurality of second AND elements, each said second AND element being connected with inputs from a different pair of numbered control bit channels and being connected as a second input to each of two correspondingly numbered first AND elements respectively in two interchanged correspondingly numbered groups.

11. A system according to claim 10 wherein each said numbered OR element and the correspondingly numbered AND element group comprise a transformer with N+1 primary input windings and at least one secondary output winding.

12. A logical matrix system comprising:
(a) $N+1$ OR elements numbered from 0 to N;
(b) $N+1$ correspondingly numbered AND element groups, each numbered group being connected as inputs to the correspondingly numbered OR element and being comprised of $N+1$ correspondingly numbered first AND elements;
(c) $N+1$ correspondingly numbered data bit channels, each numbered data bit channel being connected as a first input to the correspondingly numbered first AND element in each said numbered group;
(d) $N+1$ correspondingly numbered first control bit channels, each numbered first control bit channel being connected as a second input to one first AND element in each said numbered group, where each said one first AND element is identified by a number equal to the sum of its group and connected first control channel numbers using modulo $N+1$;
(e) N+1 correspondingly numbered second control bit channels, each numbered second control bit channel being connected as an inverted said second input to the correspondingly numbered first AND element in the correspondingly numbered group; and
(f) a $$\sum_{n=1}^{N} n$$

plurality of second AND elements, each said second AND element being connected with inputs from a different pair of numbered second control bit channels and being connected as a said second input to each of two correspondingly numbered first AND elements respectively in two interchanged correspondingly numbered groups.

13. A system according to claim 12 wherein is further included $N+1$ input control bit channels selectively connectable either to said first control bit channels or to said second control bit channels.

14. The system according to claim 12 wherein each said numbered OR element and the correspondingly numbered AND element group comprise a transformer with $N+1$ primary input windings and at least one secondary output winding.

References Cited

UNITED STATES PATENTS

| | | | |
|---|---|---|---|
| 3,076,181 | 1/1963 | Newhouse et al. | 340—172.5 |
| 3,192,363 | 6/1965 | MacSorley | 235—164 |
| 3,193,808 | 7/1965 | Sanders | 340—174 |
| 3,210,737 | 10/1965 | Perry et al. | 340—172.5 |
| 3,214,738 | 10/1965 | Parrott | 340—172.5 |
| 3,274,556 | 9/1966 | Paul et al. | 340—172.5 |
| 3,311,896 | 3/1967 | Delmege et al. | 340—172.5 |

ROBERT C. BAILEY, *Primary Examiner.*

J. P. VANDENBURG, *Assistant Examiner.*